United States Patent [19]

Freeburg

[11] Patent Number: 4,525,861
[45] Date of Patent: Jun. 25, 1985

[54] ZONED DATA COMMUNICATIONS SYSTEM FOR COMMUNICATING MESSAGE SIGNALS BETWEEN PORTABLE RADIOS AND A HOST COMPUTER

[75] Inventor: Thomas A. Freeburg, Arlington Heights, Ill.

[73] Assignee: Motorola, Inc., Schaumburg, Ill.

[21] Appl. No.: 639,770

[22] Filed: Aug. 13, 1984

Related U.S. Application Data

[62] Division of Ser. No. 441,327, Nov. 12, 1982, Pat. No. 4,481,670.

[51] Int. Cl.³ .......................... H04B 1/00; H04B 7/00
[52] U.S. Cl. ...................................... 455/33; 455/52; 455/56; 455/137
[58] Field of Search ....................... 455/33, 52, 53, 54, 455/56, 82, 83, 137; 179/2 EA, 2 EB

[56] References Cited

U.S. PATENT DOCUMENTS

| | | | |
|---|---|---|---|
| 3,310,741 | 3/1967 | Uitermark et al. | 455/33 |
| 4,028,500 | 6/1977 | McClure et al. | 455/33 |
| 4,144,412 | 3/1979 | Ito et al. | 455/33 |
| 4,144,496 | 3/1979 | Cunningham et al. | 455/33 |
| 4,369,520 | 1/1983 | Cerny, Jr. et al. | 455/33 |
| 4,434,461 | 2/1984 | Puhl | 455/33 |

Primary Examiner—Jin F. Ng

Attorney, Agent, or Firm—Rolland R. Hackbart; Edward M. Roney; James W. Gillman

[57] ABSTRACT

A data communications system is described that covers a geographic area divided into a plurality of non-overlapping zones and includes a general communications controller (GCC), a plurality of channel communications modules (CCM) and associated transmitters and receivers, and a plurality of portable radios. Message signals carrying alphanumeric information are communicated between the GCC and the portable radios by way of a radio channel. Each CCM takes a signal strength measurement every time it receives a message signal from a portable radio. The GCC gathers the signal strength measurements from the CCM receivers receiving the same message signal and computes an adjusted signal strength for each zone. The GCC then selects the zone having the largest adjusted signal strength for determining the location of the portable radio that transmitted the message signal. Whenever the GCC transmits a message signal to a portable radio, the CCM transmitter is used that covers the zone having the largest adjusted signal strength for the last transmission from that portable radio. Since the GCC can be simultaneously transmitting message signals to portable radios in other zones using non-interfering CCM transmitters, information throughput is greatly enhanced.

2 Claims, 9 Drawing Figures

ZONED DATA COMMUNICATIONS SYSTEM FOR COMMUNICATING MESSAGE SIGNALS BETWEEN PORTABLE RADIOS AND A HOST COMPUTER

This is a division of application Ser. No. 441,327, filed Nov. 12, 1982, now U.S. Pat. No. 4,481,670.

BACKGROUND OF THE INVENTION

The present invention relates generally to radio communications systems, and more particularly to an improved method and apparatus for dynamically selecting one of a plurality of radio frequency signal transmitters for transmitting message signals from a primary station to remote stations of a data communications system.

In radio communications systems covering large geographical areas, the location of remote stations such as portable or mobile radios must be known with reasonable accuracy in order to provide good quality communications. In such communications systems, the geographical area may be divided up into a number of zones or cells, each of which is covered by at least one radio transmitter and radio receiver associated with a primary station. For establishing communications between the primary station and a remote station, knowledge of the remote station's location is necessary in order that the radio transmitter covering the zone in which the remote station is located may be selected at the primary station.

The problem of selecting the radio transmitter which covers the zone in which a remote station is located has been solved with a limited degree of success in several different ways. According to one technique, the radio receiver receiving the strongest RF signal from a selected remote station is used to define the location of that remote station. The primary station simply selects the radio transmitter covering the geographical area of the receiver receiving the strongest signal from the selected remote station.

According to another technique, each remote station is assigned to a specific geographical area. In other words, a remote station is permanently associated with the zone or zones covered by a specific radio transmitter. This technique works reasonably well as long as the remote station remains within the geographical area covered by the assigned radio transmitter. However, this technique is inadequate for communications systems where each remote station is free to move about throughout a very large geographical area, making it impossible to limit a remote station to the coverage area of a single radio transmitter.

According to yet another technique that is utilized in cellular radiotelephone systems, the remote station determines the zone in which it is located by selecting the radio transmitter having the largest signal strength. This technique requires that each radio transmitter have a different frequency, and that communications from the primary station to a selected remote station be sent in all zones in order for the remote station to make its choice known on demand. This technique is adequate for radio telephone systems where the average message length is much longer than the minimum message length, but is inadequate for data communications sytems where the average message length is not much larger than the minimum message length. Therefore, in order to provide good quality communications in data communications systems, it is necessary to have a reasonably accurate determination of the location of each remote station in the system.

OBJECTS AND SUMMARY OF THE INVENTION

It is an object of the present invention to provide an improved method and apparatus for dynamically selecting one of a plurality of radio frequency signal transmitters for transmitting message signals from a primary station to a selected remote station of a data communications system.

It is another object of the present invention to provide an improved method and apparatus for dynamically determining the location of remote stations of a data communications system providing communications between a primary station and a plurality of remote stations located throughout a large geographical area.

It is yet a further object of the present invention to provide an improved method and apparatus for simultaneously transmitting message signals to two or more remote stations located in different zones of a data communications system.

Briefly described, the present invention encompasses a data communications system for communicating message signals from a host computer throughout a geographical area divided into zones, comprising: a communications controller coupled to the host computer for communicating message signals therebetween; a radio channel for carrying message signals; a plurality of remote radio stations located anywhere in the geographical area and including a transmitter and antenna for transmitting message signals on the radio channel and a receiver swithchably couplable to either the transmitter antenna or another antenna for receiving message signals; and a plurality of radio channel communications modules each located throughout the geographical area for covering at least one zone and coupled to the communications controller for communicating message signals on the radio channel to the remote radio stations in the zones covered thereby, each radio channel communications module coupled to a transmitter and antenna for transmitting message signals on the radio channel and to a receiver and at least two antennas for receiving message signals from the radio channel.

DETAILED DESCRIPTION OF THE PREFERRED EMBODIMENTS

Figure 1:
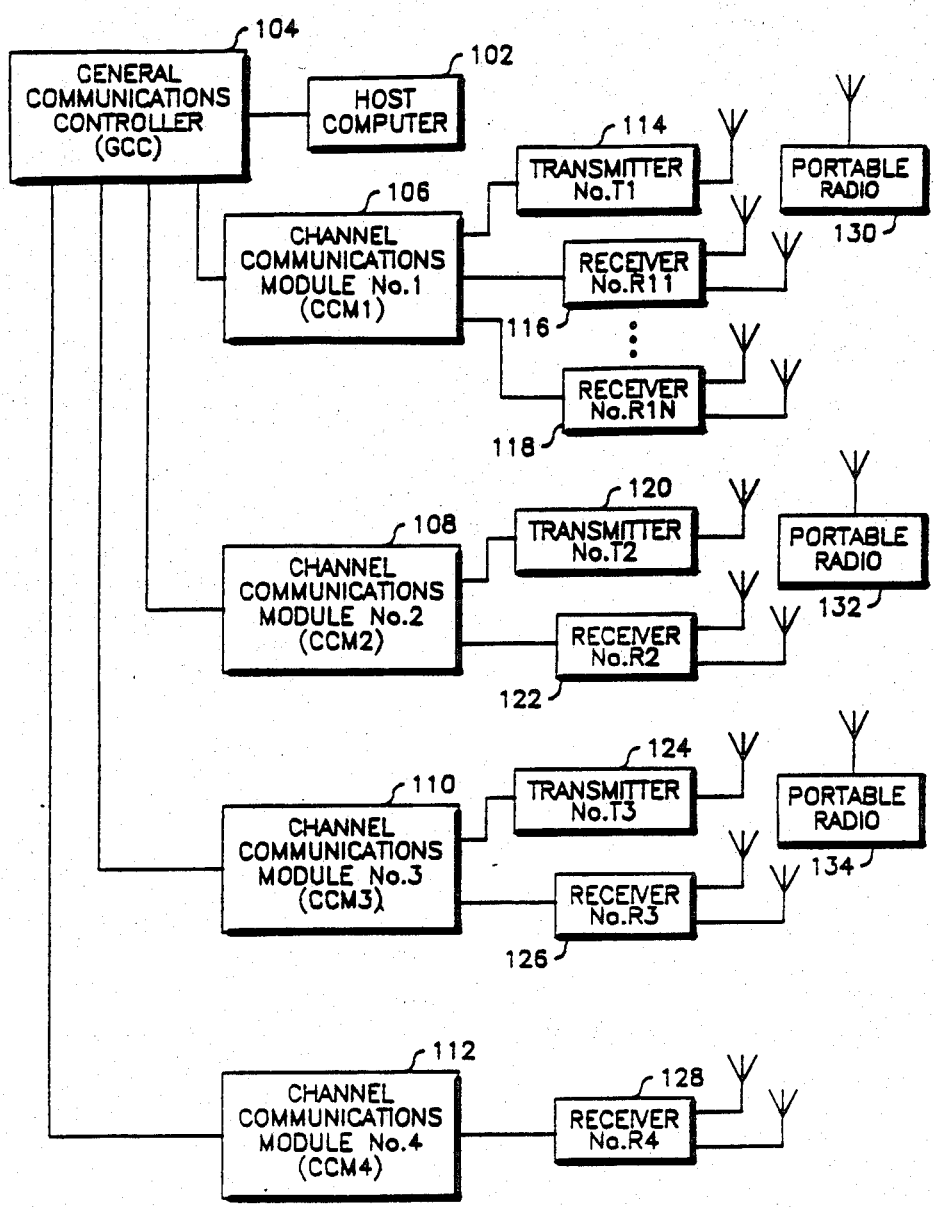
FIG. 1 is a block diagram of a data communications system that may advantageously utilize the present invention.

In FIG. 1, there is illustrated a data communications system that communicates message signals between a primary station, such as a general communications controller (GCC) 104, by way of a communications medium, such as a radio frequency (RF) communications channel, to a plurality of remote stations, such as mobile or portable radios 130, 132 and 134. Although described in the context of a data only communications system, both data signals and analog signals such as voice signals can be communicated over the RF communications channel to the portable radios 130, 132 and 134. The data communications system covers a large geographical area which is divided into a plurality of cells or zones. Located throughout the geographical area are a number of channel communications modules (CCM) 106, 108, 110 and 112, which are each coupled to and control a number of RF signal transmitters 114, 120, and 124 and RF signal receivers 116, 118, 122, 126 and 128.

The RF communications channel is preferably comprised of first and second carrier signals which may be modulated with the message signals. Transmitters 114, 120 and 124 may be operative on the first carrier signal, while receivers 116, 118, 122, 126 and 128 may be operative on the second carrier signal of the radio communications channel. Each zone of the radio communications system is covered by an assigned one of the transmitters 114, 120 and 124 and by at least one of the receivers 116, 118, 122, 126 and 128. Transmitters 114, 120 and 124 and receivers 116, 118, 122, 126 and 128 may be any suitable commercially available transmitters and receivers such as those described in Motorola Instruction Manual 68P81013E65. CCM's 106, 108, 110 and 112 may be co-located with their corresponding transmitters and receivers or may be remotely located and coupled to their corresponding transmitters and receivers by means of a suitable remote control system, such as, for example, the tone remote control system described in U.S. Pat. No. 3,577,080.

Portable radios 130, 132 and 134 may be either commercially available mobile radios of the type shown and described in Motorola instruction manual no. 68P81039E25 or commercially available hand-held portable radios of the type shown and described in U.S. Pat. Nos. 3,906,166 and 3,962,553 and in patent application Ser. No. 187,304 (now U.S. Pat. No. 4,486,624), entitled "Microprocessor Controlled Radiotelephone Transceiver", filed Sept. 15, 1980 and invented by Larry C. Puhl et al. Portable radios 130, 132 and 134 each include a transmitter operable on the second carrier signal and a receiver operable on the first carrier signal. The transmitter and receiver in portable radios 130, 132 and 134 may be any suitable commercially available conventional transmitter and receiver, such as, for example, the transmitter and receiver described in Motorola instruction manual no's. 68P81039E25 and 68P81014C65. These and the other Motorola Instruction Manuals referenced herein are available from the Service Publications Department of Motorola, Inc., 1301 East Algonquin Road, Schaumburg, Ill. or from Motorola C & E Parts, 1313 East Algonquin Road, Schaumburg, Ill.

GCC 104 of the data communications system in FIG. 1 may be coupled to a host computer 102 which may control a number of GCC's 104 that are located in different geographical areas, such as, for example, different cities. Thus, host computer 102 may gather data from, and dispatch data to, portable radios located in several different cities. GCC 104 may be coupled to host computer 102 and CCM's 106, 108, 110, and 112 by means of commercially available modems and associated dedicated telephone lines.

GCC 104 in FIG. 1 transmits message signals to and receives message signals from portable radios 130, 132 and 134. The message signals may include coded data packets which each may contain a binary preamble, a predetermined synchronization word and an information word containing a command, status or data. The format of the data packets may be any of a number of existing data formats, such as, for example, those described in U.S. Pat. Nos. 3,906,445, 4,156,867 and 4,354,252, and in U.S. patent application Ser. No. 402,682, entitled "Data Signalling System", filed July 28, 1982 and invented by Timothy M. Burke et. al.

Message signals are routed by GCC 104 to a selected CC'M 106, 108, 110 and 112 for transmission by its corresponding transmitter. Since the message signals are not transmitted on all transmitters simultaneously, as in simulcast systems of the type described in U.S. Pat. No. 4,188,522, it is necessary that GCC 104 have a reasonably accurate determination of the location of each portable radio 130, 132 and 134 so that GCC 104 may select the transmitter 114, 120 or 124 which covers the zone in which a particular portable radio is located. The improved method and apparatus of the present invention enable GCC 104 to dynamically select the transmitter 114, 120 or 124 for transmitting a message signal to a selected portable radio 130, 132 or 134.

According to another important feature of the present invention, two or more of the transmitters 114, 120 or 124 can be operated simultaneously for communicating with different portable radios located in different zones provided that transmissions from the two transmitters do not interfere with reception in the particular zones where the two portable radios are located. As a result, data throughput of the data communications system illustrated in FIG. 1 can be significantly increased by re-use of the RF communications channel. In other words, by taking advantage of re-use, a single RF communications channel can serve thousands of portable radios in a geographical area covering several states and their major cities.

Figure 2:
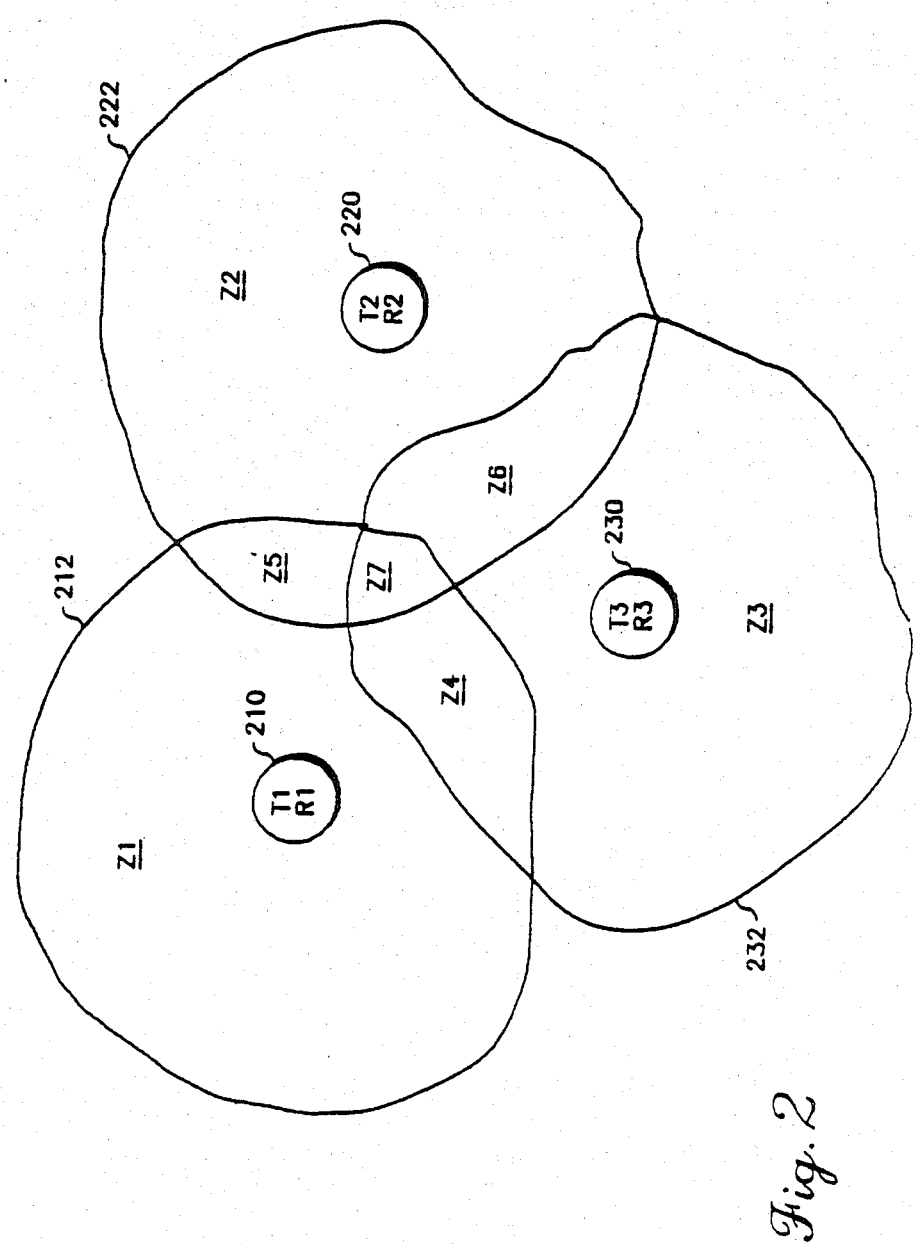
FIG. 2 is a diagram of a geographical area that is divided up into a number of zones.

Referring to FIG. 2, there is illustrated a geographical area of a data communications system that is divided into seven zones, Z1-Z7, and that includes three CCM's 210, 220 and 230 and corresponding transmitters and receivers. Transmitter T1 of CCM 210 has a coverage area within circle 212, transmitter T2 of CCM 220 within circle 222, and transmitter T3 of CCM 230 within circle 232. Each time a portable radio transmits, signal strength readings are taken by receivers R1, R2 and R3. These readings can be expressed by the following signal strength SSI matrix:

$$[SSI] = [SSI1\ SSI2\ SSI3].$$

According to the present invention, the signal strength readings taken by receivers R1, R2 and R3 can be used to compute an adjusted signal strength for each zone Z1-Z7 by adjusting the measured signal strength for each receiver R1, R2 and R3 by corresponding predetermined factors associated with the particular zone and then combining the adjusted signal strengths. The predetermined factors used to compute the adjusted signal strength depend on a number of factors such as the terrain, the height and gain of the antennas, and the sensitivity of the receivers. In other words, the predetermined factors associated with each zone are emperically determined and depend upon the characteristics of the equipment and terrain in each data communications system. The predetermined factors can be arranged in a zone selection ZSEL matrix, such as, or example, the exemplary ZSEL matrix hereinbelow:

$$[ZSEL] = \begin{bmatrix} 15.5 & 0 & 0 & 10.7 & 10.4 & 0 & 7.7 \\ 0 & 15.3 & 0 & 0 & 9.8 & 10.2 & 7.5 \\ 0 & 0 & 15.7 & 10 & 0 & 11 & 7.4 \end{bmatrix}$$

The adjusted signal strength ZADJ matrix for each of the zones Z1-Z7 is then computed according to the following matrix formula:

$$[ZADJ] = [SSI] \times [ZSEL]; \text{ or}$$

$$[ZADJ] = [Z1ADJ\ Z2ADJ\ Z3ADJ\ Z4ADJ\ Z5ADJ\ Z6ADJ\ Z7ADJ]$$

Then, using the ZADJ matrix, GCC 104 can select the zone which has the largest adjusted signal strength for a particular transmission from a portable radio. The selected zone can be stored together with other data in a location of the memory of GCC 104 associated with that portable radio.

Whenever transmitting a message signal to that particular portable radio, GCC 104 will first transmit the message signal on the carrier signal of the transmitter that covers the zone which had the largest adjusted signal strength for the last transmission from that portable radio. Both that zone and the transmitter covering it are stored in the memory of GCC 104. If the portable radio does not acknowledge the transmission of the message signal from GCC 104, GCC 104 may attempt one or more retransmissions of the message signal by means of that selected transmittter. If the retransmissions likewise are not acknowledged by the portable radio, GCC 104 may then transmit the message signal via the transmitter covering the zone which had the second largest adjusted signal strength for the last transmission from that portable radio. Again, if the portable radio does not acknowledge the transmission from GCC 104, GCC 104 may resend the message signal one or more times by means of that selected transmitter. If GCC 104 does not reach the selected portable radio by means of these two transmitters, GCC 104 may either select another transmitter covering that portable radio's "home" zone, or initiate a polling sequence in which the selected portable radio is polled in every zone in the data communications system starting with the portable radio's "home" zone.

Assuming that the SSI matrix is 10, 10, 10 for a transmission from a selected portable radio, the ZADJ matrix will be 155, 153, 157, 207, 202, 212, 226 using the predetermined factors in the above ZSEL matrix. For this particular transmission from that portable radio, the zone having the largest adjusted signal strength is zone Z7 and the zone having the second largest adjusted signal strength is zone Z6. Referring to FIG. 2, the portable station is most probably located in zone Z7 which is approximately midway between CCM's 210, 220 and 230. The second most likely location of the portable station is zone Z6 which is between CCM's 220 and 230. The transmitters T1, T2 and T3 in FIG. 2 can be assigned to cover the seven zones as follows: Zone Z1 is covered by T1, zone Z2 is covered by T2, zone Z3 is covered by T3, zone Z4 is covered by T1, zone Z5 is covered by T2, zone Z6 is covered by T3, and zone Z7 is covered by T1. For transmitting a message signal to the portable radio, transmitter T1 is used first since zone Z7 has the largest adjusted signal strength. If the portable radio does not acknowledge the first transmission or subsequent re-transmissions from transmitter T1, the message signal is next transmitted by transmitter T3 for covering zone Z6, which had the second largest adjusted signal strength for the last transmission from the portable radio.

Assuming that on a subsequent transmission from the portable radio the SSI matrix is 10, 10, 0, the ZADJ matrix is 155, 153, 0, 107, 202, 102, 152. In this case, zone Z5 has the largest adjusted signal strength, and zone Z1 has the second largest adjusted signal strength. Therefore, a message signal would first be transmitted by transmitter T2 for covering zone Z5, and thereafter transmitted by transmitter T1 for covering zone Z1.

Again, assuming that a subsequent transmission from the portable station results in an SSI matrix that is 0, 10, 10, than the ZADJ matrix is 0, 153, 157, 100, 98, 212, 149. In this case, zone Z6 has the largest adjusted signal strength, and zone Z3 has the second largest adjusted signal strength. Since transmitter T3 covers both zone Z6 and zone Z3, a message signal transmitted by transmitter T3 will reach the portable radio if it is in either zone Z6 or zone Z3. For a subsequent transmission, zone Z2 has the third largest adjusted signal strength and is covered by transmitter T2.

Next, the transmitter re-use feature of the present invention may be illustrated by the seven zone arrangement in FIG. 2. First of all, there is no transmitter interference for communications to portable radios located in zones Z1, Z2 or Z3. That is, transmitter T1, T2 and T3 can be operated simultaneously for communicating with portable radios in zones Z1, Z2 and Z3, respectively. However, for zone Z4, transmitter T3 must be off; for zone Z5 transmitter T1 must be off; for zone Z6 transmitter T2 must be off; and for zone Z7 transmitters T2 and T3 must be off. Using the foregoing interference criteria, transmitter re-use is possible for all zones except for zone Z7. For example, if the portable radio is located in zone Z4, transmitter T1 is used to communicate with that portable radio, and transmitter T2 can be simultaneously operated for communicating with portable radios in zone Z2. Similarly, while transmitter T3 is used for communicating with a portable radio in zone Z6, transmitter T2 must be off and transmitter T1 can be on. In this case, transmitter T1 could be on and communicating with a portable radio located in zone Z1. Both a transmitter selection TSEL matrix and a zone interference ZIF matrix can be used to show the above criteria. The TSEL matrix is as follows:

|         |    | T1 | T2 | T3 |
|---------|----|----|----|----|
| [TSEL] =| Z1 | 1  | 0  | 0  |
|         | Z2 | 0  | 1  | 0  |

-continued

|    | T1 | T2 | T3 |
|----|----|----|----|
| Z3 | 0  | 0  | 1  |
| Z4 | 1  | 0  | 0  |
| Z5 | 0  | 1  | 0  |
| Z6 | 0  | 0  | 1  |
| Z7 | 1  | 0  | 0  |

A one in the TSEL matrix indicates that the transmitter in that column is used for communicating with a portable radio located in the zone in that row.

The ZIF matrix is as follows:

|         |    | T1 | T2 | T3 |
|---------|----|----|----|----|
| [ZIF] = | Z1 | 0  | 0  | 0  |
|         | Z2 | 0  | 0  | 0  |
|         | Z3 | 0  | 0  | 0  |
|         | Z4 | 0  | 0  | 1  |
|         | Z5 | 1  | 0  | 0  |
|         | Z6 | 0  | 1  | 0  |
|         | Z7 | 0  | 1  | 1  |

A one in the ZIF matrix means that the transmitter in that column cannot be transmitting if it is desired to communicate with a portable radio located in the zone in that row.

Both of these matrices can be provided by tables that are stored in the memory of GCC 104 in FIG. 1. GCC 104 uses both of this matrices during the process of selecting a transmitter for communicating a message signal to a selected portable radio. For example, assuming a portable radio is in zone Z5, transmitter T2 is used and transmitter T1 must be off.

Figure 3:
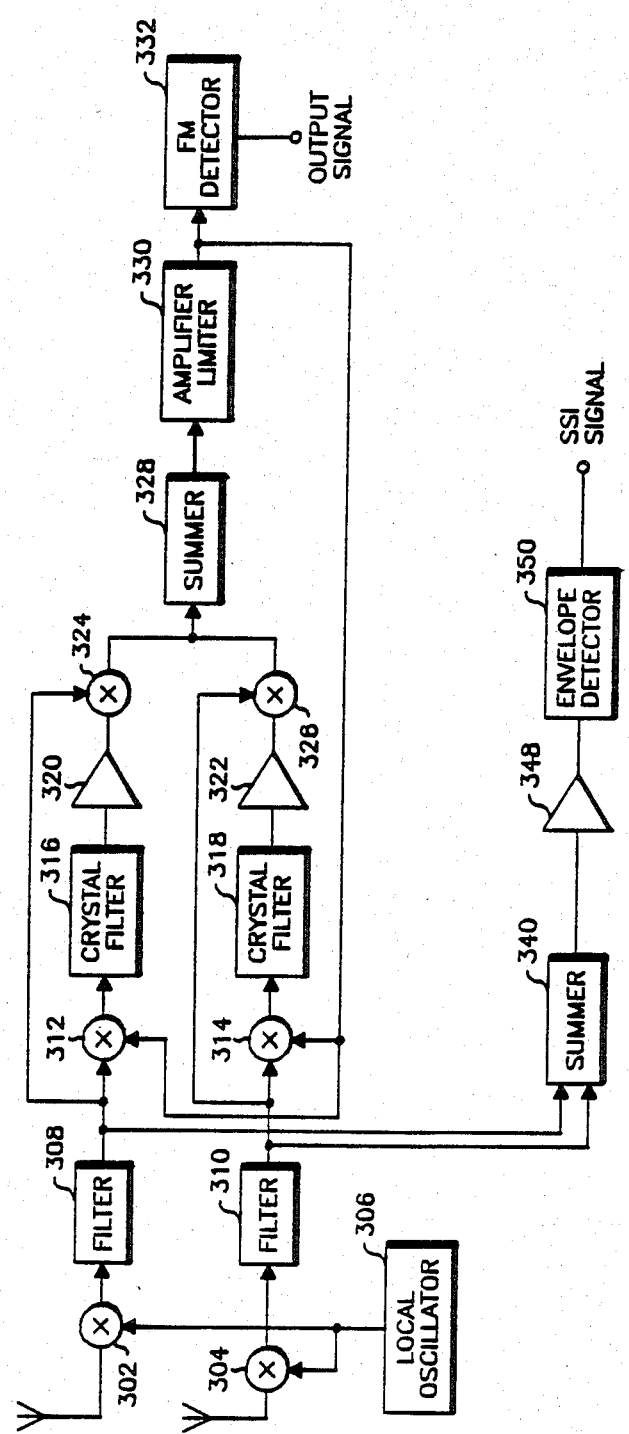
FIG. 3 is a block diagram of the circuitry in the receivers in FIG. 1.

Referring to FIG. 3, there is illustrated a detailed circuit diagram of the receivers 116, 118, 122, 126 and 128 associated with CCM's 106, 108, 110 and 112 in FIG. 1. Each receiver includes two antennas spaced at a predetermined distance from one another and a maximal ratio predetection diversity combiner 312, 314, 316, 318, 320, 322, 324, 326 and 328 for combining the signals received by each of the antennas. The space diversity provided by the two antennas is utilized to prevent degradation in communications which results when an antenna is located in an RF signal null. Rapid and deep RF signal nulls, called Rayleigh fading, are experienced in communications systems operating at RF signal frequencies in the new 800 to 900 mHz frequency range. The maximal ratio predetection diversity combiner cophases the RF signals from each antenna and linearly adds the cophased signals to provide a composite signal having components that are proportional to the square of the RF signals from each antenna. Therefore, strong signals are emphasized much more than weak signals. In other words, communications are not adversely affected if a very weak signal is received by one antenna and a reasonably good signal is received by the other antenna.

In the diversity receiver in FIG. 3, the frequency of local oscillator 306 determines the radio channel to which the diversity receiver is tuned. The RF signal received by each antenna is combined by mixers 302 and 304 with the signal from local oscillator 208 to provide corresponding IF signals. The IF signal from mixers 302 and 304 is then applied to IF bandpass filters 308 and 310, respectively, which may be a monolithic bandpass filter of conventional design similar to that described in U.S. Pat. No. 3,716,808. The filtered IF signals from filters 308 and 310 are split and fed forward via two paths to mixers 312, 324 and 314, 326, respectively. First portions of the IF signals are applied to mixers 324 and 326, and second portions of the IF signals are applied to mixers 312 and 314 together with the composite IF signal which is fed back from amplifier 330. By feeding back the composite IF signal, the IF strip of the diversity receiver forms a closed feedback loop that is regenerative on noise. Thus, the randomly varying phase of the IF signals from filters 308 and 310 relative to the composite IF signal is added into the closed loop via mixers 312 and 314 and then substracted out at mixers 324 and 326, respectively. By this process, the random phase variations are removed from the If signals in relation to the composite IF signal. The result is that each of the IF signals is cophased to the composite IF signal.

The product signals from mixers 312 and 314 at the difference frequency are applied to filters 316 and 318, respectively, which each provide a variable phase shift. Filters 316 and 318 may be two-pole crystal filters. The signals from filters 316 and 318 are linearly amplified by amplifiers 320 and 322, respectively, and applied to the second input of mixers 324 and 326, respectively. Mixers 324 and 326 multiply the signals from amplifiers 320 and 322, respectively, with the IF signals from filters 308 and 310, respectively, to provide product signals that are cophased with the composite IF signal. The product signals from mixers 324 and 326 are both cophased and proportional to the square of the level of the IF signals from filters 308 and 310, respectively. The product signals from the mixers 324 and 326 are linearly added by summer 328 to form one composite IF signal. The composite IF signal may be coupled via amplifier 330 to a conventional FM detector 332 which has an output signal providing demodulated message signals. The output signal of FM detector 332 is coupled to its corresponding CCM 106, 108, 110 or 112 in FIG. 1. Further details of the circuitry in the diversity receiver in FIG. 3 are illustrated and described in the instant assignee's co-pending U.S. patent applications, Ser. No. 22,757 (now U.S. Pat. No. 4,369,520), filed on Mar. 22, 1979, entitled "Instantaneously Acquiring Sector Antenna System", and invented by Frank J. Cerny, Jr. and James J. Mikulski, and in Ser. No. 268,613 filed on June 1, 1981 (now abandoned), entitled "Large Dynamic Range Multiplier for a Maximal Ratio Diversity Combiner", and invented by Frank J. Cerny, Jr.

FIG. 3 also illustrates the circuitry 340, 348 and 350 comprising the signal strength detector that is located in the receivers. Summer 340 is coupled to the signals from filters 308 and 310 and provides a composite signal which is coupled to amplifier 348. The output of amplifier 348 is coupled to envelope detector 350 which provides an SSI signal that is proportional to the maxima of the composite signal from amplifier 348. A separate amplifier 348 and envelope detector 350 can be provided for each of the signals from filters 308 and 310 if it is desired to measure each separately. The SSI signal from envelope detector 350 is coupled to its corresponding CCM 106, 108, 110 or 112 in FIG. 1, where it is digitized. Many other types of commercially available signal strength detecting circuitry can be utilized in place of summer 340, amplifier 348, and envelope detector 350.

Figure 4:
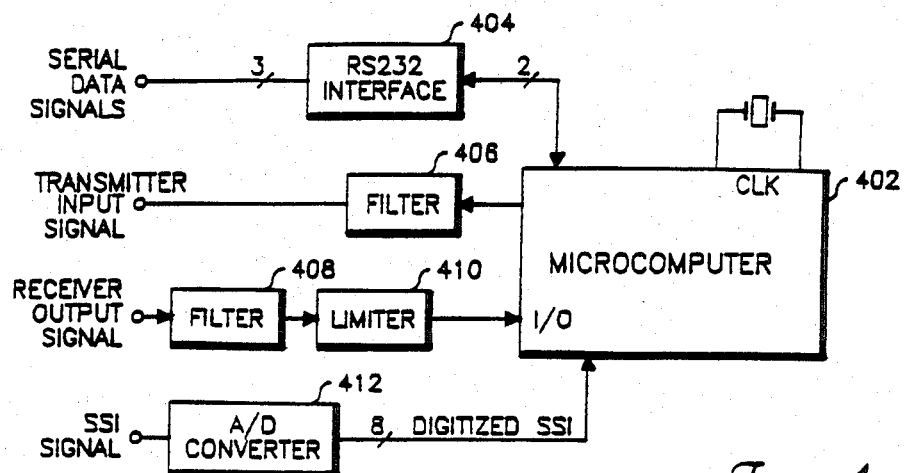
FIG. 4 is a block diagram of the circuitry in the channel communications modules in FIG. 1.

Referring to FIG. 4, there is illustrated a block diagram of the circuitry in CCM's 106, 108, 110 and 112 in FIG. 1. Each CCM includes a microcomputer 402 having a memory with stored program therein for communicating with GCC 104 and portable radios 130, 132 and 134 in FIG. 1. Microcomputer 402 can be any suitable commercially available microcomputer such as, for example, the Motorola type MC6800, MC6801 or MC68000 microprocessor, or those microprocessors described in U.S. Pat. Nos. 4,030,079 and 4,266,270, and the patents and patent applications referred to therein.

Microcomputer 402 is coupled to RS232 interface 404 which may be coupled by a modem to a dedicated telephone line from GCC 104 in FIG. 1. Message signals received by microcomputer 402 from the GCC may be coupled to filter 406 and thereafter applied to its corresponding transmitter. The message signals may be coded according to frequency-shift keying, phase-shift keying or any other suitable existing encoding scheme. Suitable message signal coding schemes are described in the aforementioned U.S. Pat. Nos. 3,906,445, 4,156,867 and 4,354,252 and patent application Ser. No. 402,682. Message signals received from portable radios by the CCM's receiver are coupled to filter 408 and thereafter to limiter 410 which converts the analog signals into a non-return-to-zero binary signal. The output of limiter 410 is applied to an input port of microcomputer 402.

Microcomputer 402 also takes signal strength readings while it is receiving message signals. The SSI signal from its corresponding receiver is coupled to A/D converter 412, which may continuously convert the analog SSI signal to a digitized SSI signal. The digitized SSI signal from A/D converter 412 is applied to an input port of microcomputer 402. Several A/D conversions are performed while a message signal is being received. The digitized SSI signals for the several conversions are averaged by microcomputer 402. The average SSI signal is appended to the received message signal which is sent by microcomputer 402 via RS232 interface 404 to GCC 104 in FIG. 1.

Figure 5:
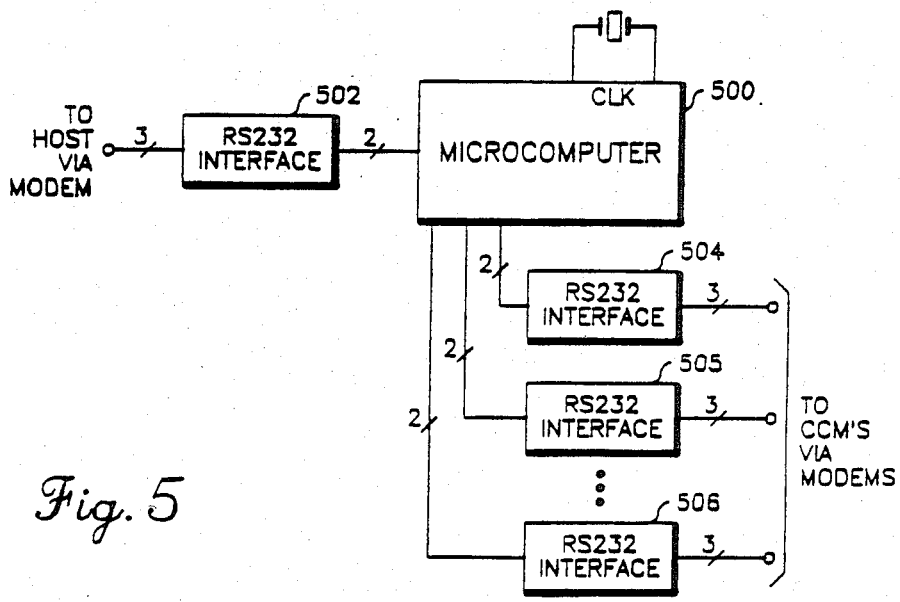
FIG. 5 is a block diagram of the circuitry in the general communications controller in FIG. 1.

Referring to FIG. 5, there is illustrated a block diagram of the circuitry in the general communications controller 104 in FIG. 1. The GCC includes a microcomputer 500 having a memory with a stored program for communicating with CCM's 106, 108, 110 and 112 in FIG. 1. Microcomputer 500 is coupled to RS232 interfaces 504, 505 and 506 which may be coupled by modems to dedicated telephone lines from each CCM. Microcomputer 500 is also coupled to RS232 interface 502 which may be coupled to a dedicated telephone line from host computer 102 in FIG. 1. Information in message signals received from portable radios by way of CCM's 106, 108, 110 and 112 is forwarded by microcomputer 500 to host computer 102. Conversely, information to be sent to portable radios from host computer 102 is transmitted to microcomputer 500 and incorporated into message signals transmitted to designated portable radios. Microcomputer 500 receives signal strength information from each of the CCM's whenever a portable radio transmits a message signal and processes the signal strength information to determine the zone in which that portable radio is presently located.

Microcomputer 500 stores for each portable radio the zone having the largest adjusted signal strength for the last transmission, the zone having the second largest adjusted signal strength for the last transmission, the "home" zone assigned to that portable radio, and the last zone used for communications with that portable radio. For subsequent transmissions of message signals to a portable radio, the GCC accesses the zone location information for that portable radio and selects a transmitter for transmitting a message signal in the zone in which the portable radio is most likely located. Microcomputer 500 also keeps track of which transmitters are in use and which transmitters interfere with communications in a particular zone. Thus, when transmitting a message signal in the zone where a selected portable radio is located, microcomputer 500 inhibits the use of other transmitters which would interfere with communications in that zone. If transmission of a message signal to a portable radio would interefere with a transmission already under way, microcomputer 500 queues that message signal for transmission when the interfering transmitter has completed its transmission. Microcomputer 500 can be any suitable commercially available microcomputer, such as, for example, a Motorola type MC6800, MC6801 or MC68000 microprocessor, or those microprocessors described in U.S. Pat. Nos. 4,030,079 and 4,266,270 and the patents and patent applications referred to therein.

Figure 8:
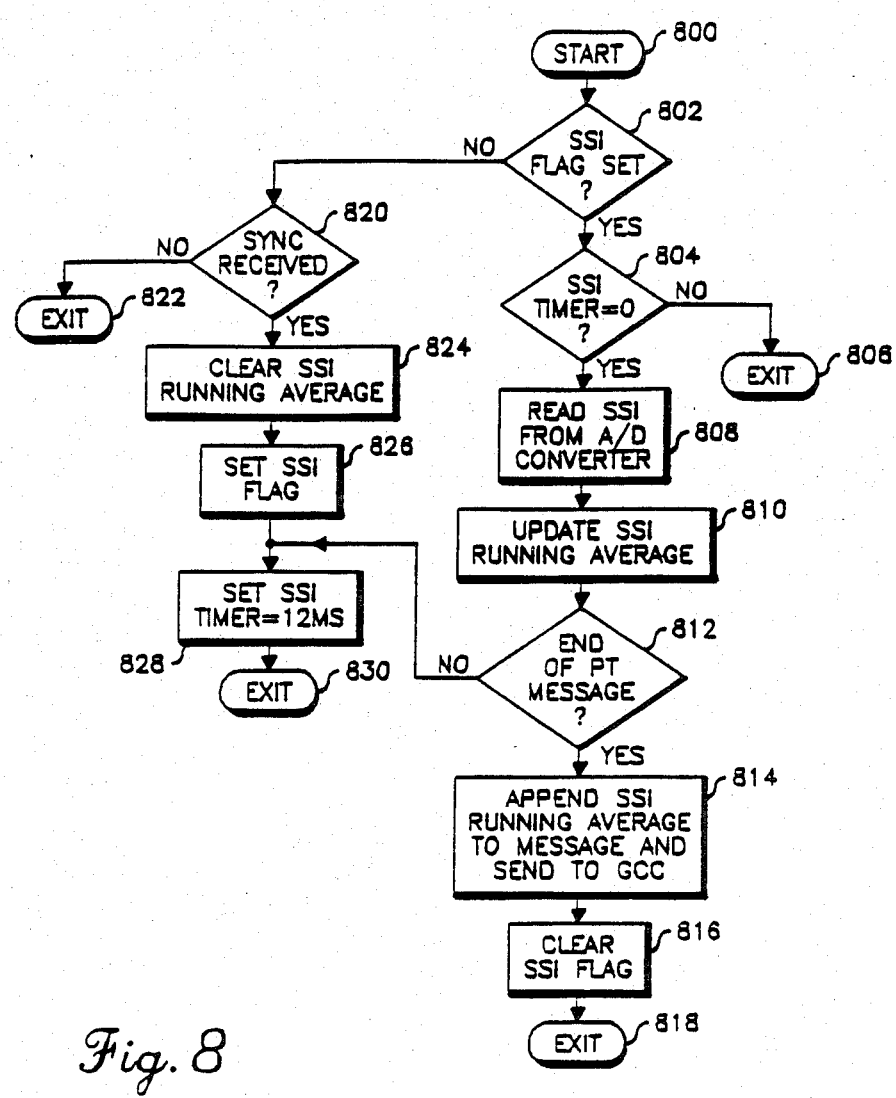
FIG. 8 is a flow chart used by the channel communications module for measuring the signal strength of signals transmitted by the portable radios in FIG. 1.

Referring next to FIG. 8, there is illustrated a flow chart including the process steps used by CCM's 106, 108, 110 and 112 in FIG. 1 for measuring the signal strength of RF signals transmitted by portable radios. The flow chart in FIG. 8 provides a detailed description of the process steps required for execution by microcomputer 402 in FIG. 4. The coding of the process steps of the flow chart in FIG. 8 into the instructions of a suitable commercially available microcomputer is a mere mechanical step for a routineer skilled in the art.

Entering the flow chart in FIG. 8 at start block 800, a check is made to see if the SSI flag is set at decision block 802. If the SSI flag is not set, NO branch is taken to decision block 820 where it is determined whether or not a SYNC (synchronization) word has been detected. The SYNC word is part of each data packet in a message signal and is followed by alphanumeric information. The particular bit pattern of the SYNC word is detected by microcomputer 402 in FIG. 4. Signal strength measurements need not be taken until a SYNC word is detected. Once a SYNC word has been detected, several signal strength measurements can be taken at different times during receipt of the message signal and then averaged to obtain a more realistic estimate of the signal strength for the portable radio transmitting that message signal.

If a SYNC word has not been received, NO branch is taken from decision block 820 to block 822 to exit from the flow chart in FIG. 8. Otherwise, YES branch is taken from decision block 820 to block 824 where the SSI running average is cleared. Next, at block 826, the SSI flag is set, and then at block 828 the SSI timer is set to twelve milliseconds. Assuming that a data packet has a length of approximately twenty-four milliseconds, the SSI timer is set at twelve milliseconds so that two signal strength measurements will be taken for each data packet. Next, the flow chart is exited at block 830.

Returning back to block 802 in FIG. 8, the SSI flag is set whenever a message signal is being received from a portable radio. Assuming the SSI flag was previously set, YES branch is taken from decision block 802 to decision block 804 where it is determined if the SSI timer is equal to zero. Assuming that microcomputer 402 in FIG. 4 is interrupted once every millisecond, the SSI timer may be decremented and the flow chart in FIG. 8 may be executed every millisecond in response to each interrupt. As a result, the SSI timer will be zero twelve milliseconds after a SYNC word has been received. If the SSI timer is not equal to zero, NO branch is taken to exit from the flow chart at block 806. Otherwise, YES branch is taken to block 808 where the digitized SSI signal is read from A/D converter 412 in FIG. 4. Next, at block 810, the newly read digitized SSI signal is averaged with the SSI running average.

Proceeding to decision block 812 in FIG. 8, a check is made to determine if the end of the portable radio message signal has been reached. If the end of the message signal has not been reached, NO branch is taken to block 828 where the SSI timer is set to twelve milliseconds for taking another signal strength measurement. Otherwise, YES branch is taken from decision block 812 to block 814, where the SSI running average is appended to the message signal which is sent to GCC 104 in FIG. 1. Next, at block 816, the SSI flag is cleared in preparation for receipt of subsequent message signals, and the flow chart is exited at block 818.

The process steps of the flow chart in FIG. 8 are designed to take two signal strength measurements for each data packet in a message signal received from a portable radio. For example, if there are four data packets in a message signal, eight signal strength measurements are taken and averaged. All CCM's 106, 108, 110 and 112 in FIG. 1 receiving the same message signal from a portable radio are likewise taking two signal strength measurements per data packet and appending the average signal strength to the message signal that is routed to the GCC. Therefore, within a short period of time, the GCC will be receiving several different average signal strength measurements from the CCM's that receive the same message signal from a portable radio.

Figure 6:
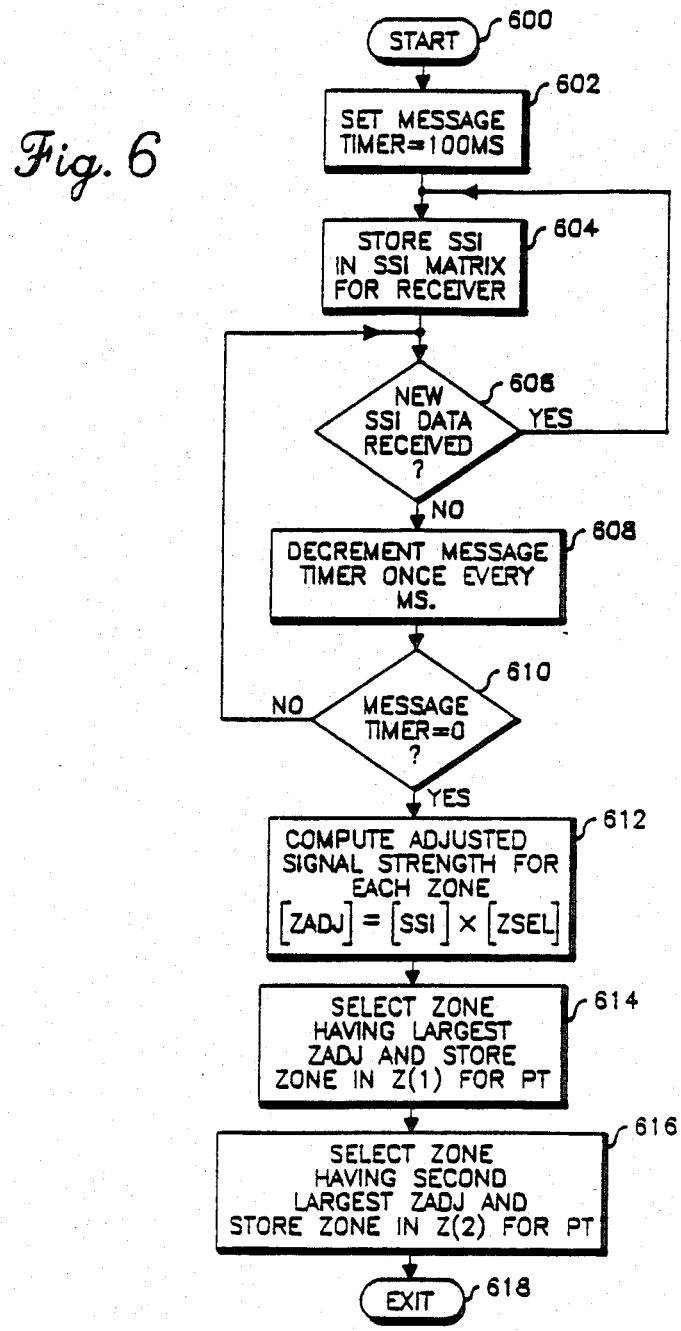
FIG. 6 is a flow chart used by the general communications controller for processing signal strength data received from the channel communications modules in FIG. 1.

Referring to FIG. 6, there is illustrated a flow chart used by GCC 104 for processing the average signal strength measurements received from each of the CCM's 106, 108, 110 and 112 in FIG. 1. The flow chart in FIG. 6 is entered at start block 600 whenever a message signal together with an average signal strength measurement is received from a CCM. Next, at block 602 a message timer is set to one-hundred milliseconds to provide a time interval during which the same message signal is received by other CCM's and sent together with an average signal strength measurement to the GCC. All CCM's should receive, if at all, the same message signal at approximately the same time. The one-hundred millisecond message time interval is utilized to allow for CCM processing and transmission delays. Assuming that microcomputer 500 in FIG. 5 is interrupted once every millisecond, the message timer may be decremented in response to each interrupt.

Next, at block 604 in FIG. 6, the average signal strength measurement received with a message signal is entered into the SSI matrix in the position for the receiver that took the measurement. Proceeding to decision block 606, a check is made to see if another average signal strength measurement has been received from another CCM. If so, YES branch is taken back to block 604. Otherwise, NO branch is taken to block 608 where the message timer is decremented once every millisecond. Next, at decision block 610 a check is made to see if the message timer is equal to zero. If not, NO branch is taken back to decision block 606 to check to see if another average signal strength measurement has been received. Otherwise, YES branch is taken to block 612 for processing the average signal strength measurements that have been received during the previous one-hundred millisecond time interval.

Proceeding to block 612 in FIG. 6, an adjusted signal strength is computed for each zone using the newly received average signal strength measurements that have been entered into the SSI matrix and the predetermined factors previously entered into the ZSEL matrix. The ZADJ matrix is computed by multiplying the SSI matrix and the ZSEL matrix according to the formula:

$$[ZADJ] = [SSI] \times [ZSEL]$$

The resulting ZADJ matrix has one adjusted signal strength for each zone in the data communications system. Since some of the zones may be in different cities, some of the adjusted signal strengths may be zero. For the zone configuration in FIG. 2, it is possible that transmissions from a portable radio will be received by all three receivers R1, R2 and R3, producting an adjusted signal strength for all seven zones Z1–Z7.

According to another feature of the present invention, the SSI matrix can be stored and later used in combination with the SSI matrix for the next transmission from the same portable radio. For example, the signal strength measurements in the stored SSI matrix can be decreased on the basis of the time interval between the previous and newly received transmission from the portable radio. Next, the decreased signal strength measurements and the new signal strength measurements may be averaged for each CCM receiver, and the average signal strength measurements may be used to calculate the ZADJ matrix in block 612. The updated average signal strength measurements may then be stored in the SSI matrix for use with the signal strength measurements taken for a subsequent transmission from the same portable radio.

Next, at block 614 in FIG. 6, the zone having the largest adjusted signal strength in the ZADJ matrix computed in block 612 is selected and stored in zone location Z(1) for the portable radio whose transmitted message signal was received by each of the CCM's. The number of CCM's receiving a message signal and making a signal strength measurement for a portable radio will vary depending both on the location of the portable radio and the terrain and location of receivers in the geographical area of the data communications system. In other words, depending on the location of a portable radio, as few as one and potentially all of the CCM receivers may receive the same message signal from a portable radio.

Next, at block 616, the zone having the second largest adjusted signal strength in the ZADJ matrix is selected and stored in zone location Z(2) for the particular portable radio. Zone locations Z(1) and Z(2) are the most likely zones in which that portable radio is located. Every time the portable radio transmits a message signal, new signal strength measurements are taken and the zones stored in zone locations Z(1) and Z(2) are updated. Therefore, according to the present invention, the location of each portable radio is updated every time that portable radio transmits a message signal using the average signal strength measurement taken by all of the CCM receivers that receive its message signal. Since the signal strength measurements from all CCM receivers receiving the same message signal are used, a reasonably accurate determination of the portable radio's location can be made. To insure that location information does not become stale, GCC in FIG. 1 can initiate a short where-are-you message signal for those portable radios that have been inactive for a relatively long period of time.

Figure 7:
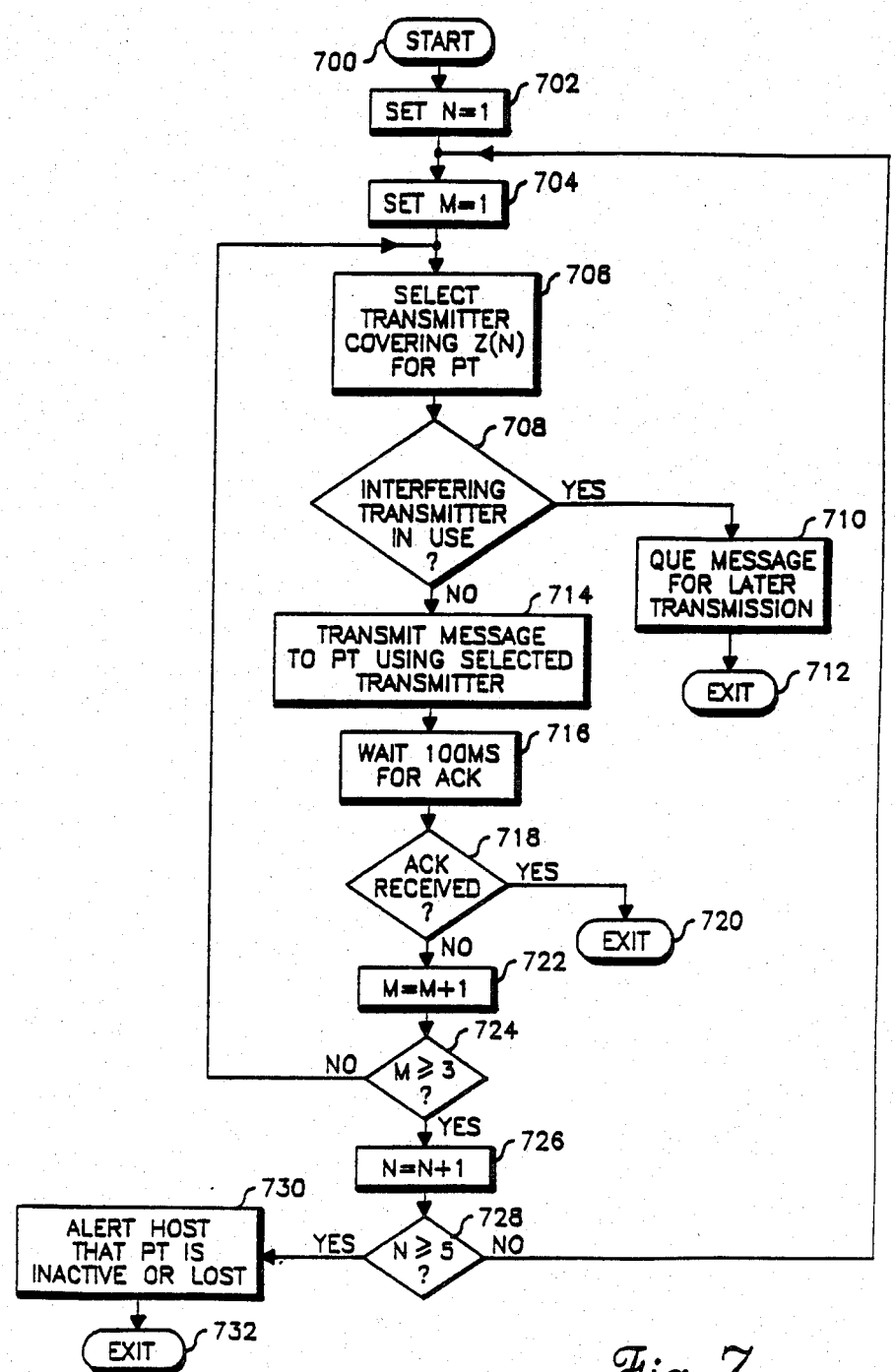
FIG. 7 is a flow chart used by the general communications controller for selecting a transmitter on which data signals are transmitted to a selected portable radio in FIG. 1.

Whenever it is desired to transmit a message signal from GCC 104 in FIG. 1 to a selected portable radio, the flow chart in FIG. 7 is utilized by the GCC for selecting the CCM transmitter covering the zone in which the selected portable radio is most likely to be located. Entering the flow chart in FIG. 7 at start block 700, N is set equal to 1 at block 702 and M is set equal to one at block 704. N is an integer number used to determine which zone location Z(1), Z(2), Z(3) or Z(4) is selected, and M is an integer number used to determine the number of re-transmissions made to a particular zone.

Next, at block 706 in FIG. 7, the GCC selects the transmitter covering zone location Z(N) for the selected portable radio. Initially, the GCC selects zone location Z(1). As previously explained, zone location Z(1) is the zone having the largest adjusted signal strength for the last transmission from the selected portable radio, zone location Z(2) is the zone having the second largest adjusted signal strength for the last transmission from the selected portable radio, zone location Z(3) is the "home" zone for the selected portable radio, and zone location Z(4) is the zone location used for the last transmission to the selected portable radio.

Proceeding next to decision block 708 in FIG. 7, a check is made to see if an interfering transmitter is in use. The interfering transmitters are determined by reference to the ZIF matrix, which identifies transmitters that interfere with communications in zone location Z(N). If an interfering transmitter is in use, YES branch is taken to block 710 where the message signal is queued for later transmission to the selected portable radio, and the flow chart is exited at block 712. If an interfering transmitter is not in use, NO branch is taken to block 714 where a message signal is transmitted to the selected portable radio using a transmitter selected from the TSEL matrix for covering zone location Z(N). At the same time, interfering transmitters selected from the ZIF matrix for zone location Z(N) may be inhibited from transmitting while the message signal is being sent to the selected portable radio.

Next, at block 716 in FIG. 7, the GCC waits for one hundred milliseconds to determine if an acknowledgement message has been received from the selected portable radio. If the selected portable radio is actually in zone location Z(N) and receives the transmitted message signal, it will transmit an acknowledgement signal indicating that the message signal has been properly received. Proceeding to decision block 718, a check is made to see if an acknowledgement signal has been received. If so, YES branch is taken to block 720 and the flow chart is exited. In other words, the message signal has been successfully communicated to the selected portable radio. If an acknowledgement signal has not been received, NO branch is taken to block 722 where M is incremented by 1. The variable M is used to provide for one or more re-transmissions of the message signal to the same zone location. In the preferred embodiment, one re-transmission is allowed. Therefore, at decision block 724 a check is made to see if M is greater than or equal to three. If M is less than three, NO branch is taken back to block 706 for re-transmitting the message signal to zone location Z(N). If M is greater than or equal to three, YES branch is taken to block 726 for preparing to transmit the message signal in the next zone location.

At block 726 in FIG. 7, N is incremented by one for selecting the next zone location. Proceeding to decision block 728, a check is made to see if N is greater than or equal to five. If N is less than five, NO branch is taken to block 704 where M is set equal to one and the process steps are repeated for the next zone location Z(N). The process steps are repeated beginning at block 704 for each of the zone locations Z(2), Z(3), and Z(4) so that a message signal is transmitted, and re-transmitted once, in all four stored zone locations in an attempt to communicate a message signal to a selected portable radio. If N is greater than or equal to five, YES branch is taken from decision block 728 to block 730 where the GCC alerts host computer 102 in FIG. 1 that the portable radio is either inactive or lost. At this point in time, the host computer may decide to poll the portable radio in every zone of the data communications system. Such a poll would be conducted on a low priority basis using a minimum length message signal. Next, the flow chart in FIG. 7 is exited at block 732.

The flow charts in FIGS. 6 and 7 provide a detailed description of the process steps used by GCC microcomputer 500 in FIG. 5 for communicating message signals to portable radios. The coding of the process steps of the flow charts in FIGS. 6 and 7 into the instructions of a suitable commercially available microcomputer is a mere mechanical step for a routineer skilled in the art. By way of analogy to an electrical circuit diagram, the flow charts in FIGS. 6, 7 and 8 are equivalent to a detailed schematic for an electrical circuit where provision of the exact part values for the electrical components in the electrical schematic corresponds to provision of microcomputer instructions for blocks in the flow charts.

Figure 9:
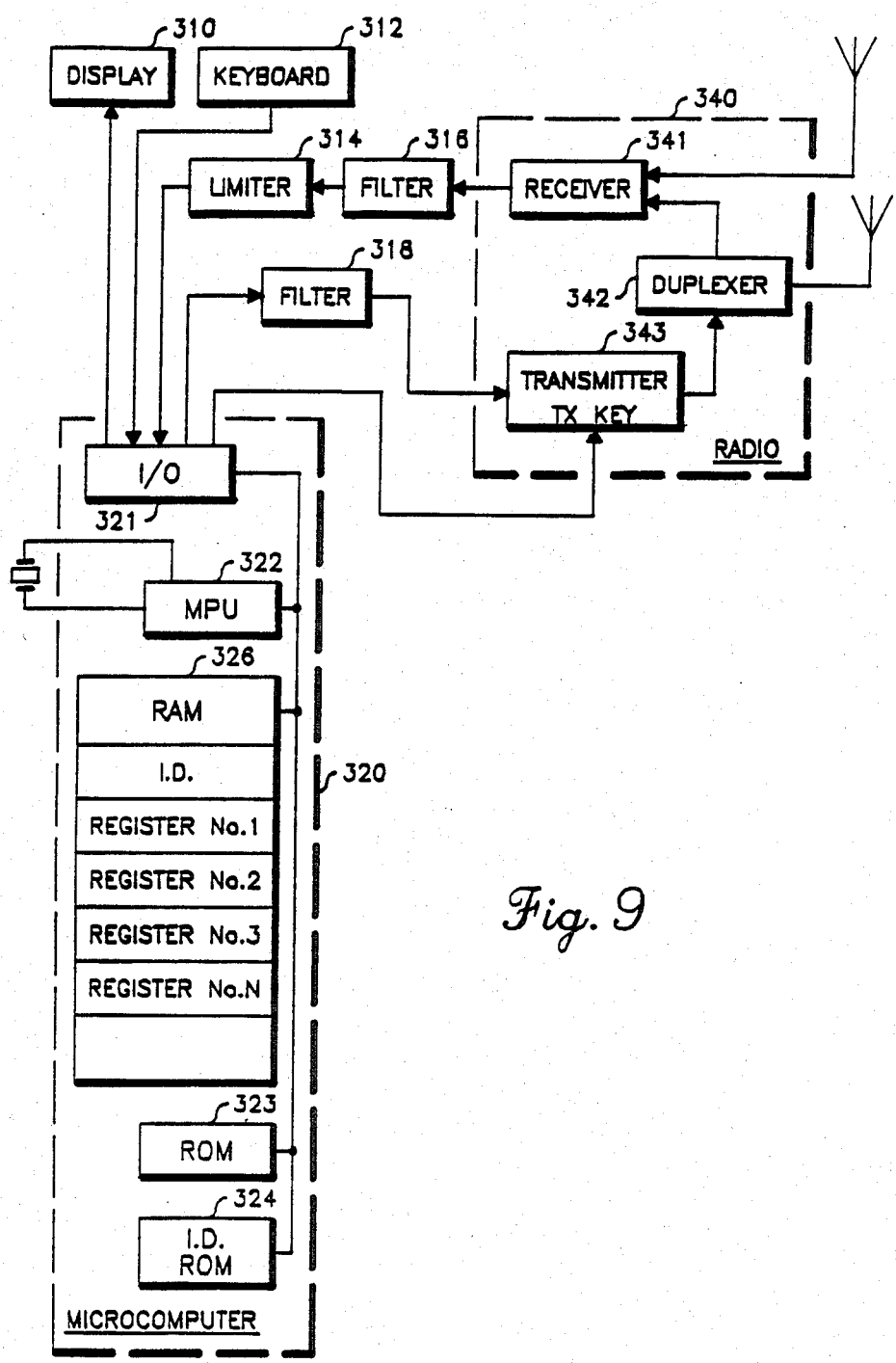
FIG. 9 is a block diagram of the circuitry in the portable radios in FIG. 1.

Referring to FIG. 9, there is illustrated a block diagram of the circuitry in portable radios 130, 132 and 134 in FIG. 1. Each portable radio includes a radio transceiver 340, a microcomputer 320, an alphanumeric display 310, and a keyboard 312. Alphanumeric display 310 may be any commercially available display, such as an LCD display or gas discharge display, that provides for the display of one or more lines of alphanumeric information. Display 310 is controlled by I/O device 321 of microcomputer 320. Keyboard 312 may be any commercially available keyboard having both numeric and alphanumeric keys. Keyboard 312 is coupled to I/O device 321 of microcomputer 320, which senses activation of its various keys.

Radio transceiver 340 in FIG. 9 may be any suitable commercially available transceiver, such as that described in the aforementioned Motorola instruction manual no. 68P81039E25 and in Motorola instruction manual no. 68P81014C65. Radio transceiver 340 includes two antennas spaced at a predetermined distance from one another for providing receiver diversity. Receiver 341 is coupled directly to one antenna and coupled by duplexer 342 to the other antenna. Duplexer 342 may be any suitable commercially available duplexer such as that described in U.S. Pat. No. 3,728,731. Receiver 341 may include suitable commercially available circuits for selecting between the two antennas, such as, for example, the antenna selection circuitry in the aforementioned Motorola instruction manual no. 68P81039E25. Receiver 341 demodulates message signals transmitted from the CCM transmitters. The demodulated message signals are filtered by filter 316 and limited by limiter 314 and thereafter applied to I/O device 321 of microcomputer 320. Message signals from I/O device 321 of microcomputer 320 are applied to filter 318 and thereafter to transmitter 343 for transmission to CCM receivers. Transmitter 343 is turned on in response to the TX key signal from I/O device 321 of microcomputer 320. The output of transmitter 343 is coupled to one of the radio transceiver antennas by way of duplexer 342.

Microcomputer 320 in FIG. 9 includes I/O devices 321, microprocessor (MPU) 322, random-access memory (RAM) 326, read-only memory (ROM) 323, and I.D. ROM 324. MPU 322 may be any suitable commercially available microprocessor, such as, for example, the Motorola type MC6800, MC6801 or MC68000 microprocessors, or those microprocessors described in U.S. Pat. Nos. 4,030,079 and 4,266,270 and the patent applications referred to therein. Similarly, I/O device 321, RAM 326, ROM 323 and I.D. ROM 324 may be any commercially available devices that are suitable for operation with the type of microprocessor selected for MPU 322. I.D. ROM 324 is a removable device that includes a specific identification code or address that is assigned to a portable radio. ROM 323 stores the control program that is executed by MPU 322 for communicating message signals and acknowledgement signals to GCC 104 in FIG. 1. RAM 326 includes both a scratch pad area used by MPU 322 during execution of the control program stored in ROM 323 and a number of register locations allocated for storing the identification code read in by MPU 322 from I. D. ROM 324, information displayed by display 310, information entered from keyboard 312, and other status information. The contents of specific registers in RAM 326 may be loaded from message signals received from GCC 104 in FIG. 1 or may be included in message signals sent by MPU 322 to the GCC. The formatting of register information into message signals may be accomplished as described in the aforementioned U.S. patent application, Ser. No. 402,682, which application also includes a listing of suitable control program.

The portable radio illustrated in FIG. 9 may be either a mobile radio that is installed in a vehicle or a portable radio that is small enough to be hand-carried from place to place (See the aforementioned Motorola instruction manual Number 68P81014C65). Although the portable radio in FIG. 9 is primarily adapted to transmit and receive message signals including alphanumeric information, the portable radio may also provide voice communications by means of a speaker connected to the output of receiver 341 and a microphone connected to the input of transmitter 343. A portable radio adapted to communicate both alphanumeric information and voice signals is described in the instant assignee's co-pending U.S. patent application Ser. No. 323,644, (now U.S. Pat. No. 4,430,792) filed Nov. 20, 1981, entitled, "Data Muting Method and Apparatus for Radio Communications System", and invented by Thomas A. Freeburg et. al.

In summary, unique methods and apparatus for transmitter selection and transmitter re-use in data communications systems have been described. By selecting the proper transmitter for transmitting message signals to portable radios, unnecessary transmissions are eliminated, freeing up the radio channel for communications with other portable radios. Moreover, transmitters which do not interfere with communications already underway to a particular zone can be simultaneously transmitting message signals to portable radios in other zones, thus greatly enhancing message signal throughput.

I claim:

1. A data communications system for communicating message signals from a host computer throughout a geographical area divided into zones, comprising:
    a communications controller coupled to the host computer for communicating message signals therebetween;
    a radio channel for carrying message signals;
    a plurality of remote radio stations located anywhere in the geographical area and including a transmitter and antenna for transmitting message signals on the radio channel and a receiver switchably couplable to either the transmitter antenna or another antenna for receiving message signals; and
    a plurality of radio channel communications modules each located throughout the geographical area for covering at least one zone and coupled to the communications controller for communicating message signals on the radio channel to the remote radio stations in the zones covered thereby, each radio channel communications module coupled to a transmitter and antenna for transmitting message signals on the radio channel and to a receiver and at least two antennas for receiving message signals from the radio channel.

2. The data communications system according to claim 1, wherein each of said receivers coupled to a corresponding radio channel communications module further includes a maximal-ratio predetection diversity combiner coupled to the two antennas associated with that receiver for combining the signals received by each antenna to provide a composite signal.

* * * * *